United States Patent [19]

Hefner, Jr.

[11] Patent Number: 4,555,554
[45] Date of Patent: Nov. 26, 1985

[54] OLIGOMERIC VINYL ESTER RESIN COMPOSITIONS CONTAINING TRIAZINE GROUPS AND IMINO CARBAMATE LINKAGES

[75] Inventor: Robert E. Hefner, Jr., Lake Jackson, Tex.

[73] Assignee: The Dow Chemical Company, Midland, Mich.

[21] Appl. No.: 702,700

[22] Filed: Feb. 15, 1985

[51] Int. Cl.$^4$ .............................................. C08G 59/16
[52] U.S. Cl. ................................... 525/531; 525/534; 528/96; 528/97; 528/98; 528/99; 528/120; 528/121; 528/128; 528/150; 528/211
[58] Field of Search ................. 525/531, 534; 528/96, 528/97, 98, 99, 120, 121, 128, 150, 211

[56] References Cited

U.S. PATENT DOCUMENTS

| | | | |
|---|---|---|---|
| 2,893,978 | 7/1959 | Cooke | 528/96 X |
| 3,978,028 | 8/1976 | Sundermann et al. | 528/211 |
| 4,042,567 | 8/1977 | Sundermann | 528/211 |
| 4,049,630 | 9/1977 | Sundermann et al. | 528/211 |
| 4,195,132 | 3/1980 | Sundermann et al. | 528/211 X |
| 4,487,915 | 12/1984 | Hefner, Jr. | 528/96 |
| 4,489,202 | 12/1984 | Hefner, Jr. | 528/95 |
| 4,515,934 | 5/1985 | Hefner | 528/96 X |

*Primary Examiner*—Earl Nielsen
*Attorney, Agent, or Firm*—J. G. Carter

[57] ABSTRACT

Oligomeric vinyl esters are prepared by reacting (A) an epoxy resin prepared by co-oligomerizing (1) a mixed cyanate of a polyphenol and (2) an aromatic polyamine with (B) a monounsaturated monocarboxylic acid.

These vinyl ester resins are (oligomeric vinyl ester and copolymerizable monomer blend) useful in the preparation of laminates, composites, castings, coatings and the like.

40 Claims, No Drawings

OLIGOMERIC VINYL ESTER RESIN COMPOSITIONS CONTAINING TRIAZINE GROUPS AND IMINO CARBAMATE LINKAGES

BACKGROUND OF THE INVENTION

The present invention provides novel oligomeric vinyl esters prepared from polyepoxides of the co-oligomerization product of a mixed cyanate of a polyphenol and an aromatic polyamine.

Vinyl esters are the reaction product of about equivalent amounts of a monounsaturated monocarboxylic acid and a polyepoxide. One class of vinyl esters is described by Bearden in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al describes vinyl esters where the molecular weight of the polyepoxide is increased by reacting a dicarboxylic acid with the polyepoxide resin as well as acrylic acid, etc. in U.S. Pat. No. 3,256,226. Other functional compounds containing a group which is reactive with an epoxide group, such as an amine, mercaptan and the like, may be utilized in place of the dicarboxylic acid. All of the above-described compositions, which contain the characteristic linkages

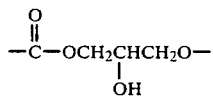

and terminal polymerizable vinylidene groups are classified as vinyl esters and are incorporated herein by reference.

The vinyl ester is typically combined with a reactive diluent, a copolymerizable vinyl monomer, to alter the viscosity of the mixture, to vary the properties of the cured coating, or for other known reasons. Most any vinyl monomer may be employed which is copolymerizable with the unsaturated groups of the vinyl ester. Such monomers include both monovinyl and polyvinyl monomers. Typical monomers include the alkenyl aromatic monomers such as styrene, α-methylstyrene, vinyltoluene, t-butyl styrene and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers are especially useful for ultra-violet light curable systems such as 2-acetoxyalkyl acrylates; pentaerythritol di-, tri- or tetra-acrylates and the like and may be added in any order.

The vinyl ester and copolymerizable vinyl monomer blend is a crosslinkable vinyl ester resin which is cured by mixing in a free radical forming catalyst in an amount ranging from 0.1 to about 5 percent by weight, preferably 1 and 2 percent by weight. Examples of these catalysts are benzoyl peroxide, tertiary butyl hydroperoxide, methylethylketone peroxide and the like. It is frequently of value to add an accelerator such as N,N-dimethylaniline, cobalt naphthenate and the like.

Preparation of hydroxyaromatic oligomers containing triazine groups and polyepoxides thereof is taught by R. E. Hefner, Jr. in U.S. Pat. No. 4,489,202 issued Dec. 18, 1984 which is incorporated herein by reference. The process of this invention uses an easily prepared mixed cyanate of a diphenol or polyphenol. More specifically, the process disclosed therein comprises reacting at least one material having an average of more than one aromatic hydroxyl group per molecula with at least 0.01 but not more than 0.95, preferably from about 0.05 to about 0.55 moles of cyanogen halide or mixture of cyanogen halides per aromatic hydroxyl group in the presence of a suitable base in a quantity of from about 0.01 to about 1.1, preferably from about 0.05 to about 0.6, moles per aromatic hydroxyl group at a temperature and time sufficient to essentially complete the reaction and thereafter recovering the resultant cyanate mixture; trimerizing the cyanate mixture in the presence of a suitable trimerization catalyst at a temperature and time to essentially complete the trimerization reaction; epoxidizing the resultant trimerized product in a conventional manner by reaction with an epiholohydrin with subsequent dehydrohalogenation with a basic-acting material and finally recovering the resultant triazine functional glycidyl ether product. Excellent control over the molecular weight and content of triazine groups is provided by this process. The epoxy resin compositions of this invention possess unusually high thermal stability as well as excellent overall physical and mechanical properties.

Preparation of hydroxyaromatic oligomers containing triazine and oxazoline groups and polyepoxides thereof is disclosed in U.S. Pat. No. 4,487,915 issued Dec. 11, 1984. The process disclosed therein uses the aforementioned mixed cyanate of a diphenol or polyphenol. Co-oligomerization of this cyanate mixture with an epoxy resin such as the diglycidyl ether of bisphenol A, provides hydroxyaromatic oligomers containing both triazine and oxazoline groups. Oligomers prepared from co-oligomerization of the mixed cyanate of a diphenol with an epoxy resin using mole ratios of epoxy groups to cyanate groups of about 1 to 10 to about 1 to 40 or more are most preferred in the process of this invention. The oligomers, and unreacted diphenol, if any, are then epoxidized using methods well known in the art. The epoxy resin compositions of this invention possess excellent thermal stability as well as enhanced mechanical properties.

Preparation of advanced epoxy resin compositions containing triazine groups or both triazine and oxazoline groups is taught by R. E. Hefner, Jr. in allowed application Ser. No. 582,415 filed Feb. 22, 1984. In the process disclosed herein the respective triazine-containing or triazine-containing and oxazoline-containing hydroxyaromatic oligomers are reacted with an epoxy resin. The invention consists of the advanced epoxy resins as well as cured compositions thereof.

Preparation of vinyl ester resin compositions containing triazine groups or both triazine and oxazoline groups is taught by R. E. Hefner, Jr. in allowed application Ser. No. 590,819 filed Mar. 19, 1984. In the process disclosed herein the respective triazine or triazine and oxazoline functional epoxy resins are reacted with a monounsaturated carboxylic acid. The invention consists of the vinyl esters and the vinyl ester and copolymerizable vinyl monomer formulations, whether or not cured.

Preparation of hydroxyaromatic oligomers containing triazine groups and

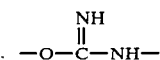

linkages, otherwise called "imino carbamate" as well as epoxy resins and advanced epoxy resins thereof is taught in copending application Ser. No. 702,699 filed of even date herewith, entitled "Hydroxyaromatic Oligomers of a Mixed Cyanate and Aromatic Polyamine and Epoxy Resins Thereof" by Robert E. Hefner, Jr. The oligomers are prepared by co-oligomerization of a mixed cyanate of a polyphenol with an aromatic polyamine in the process of this invention. Epoxidation of the oligomers and unreacted polyphenol, if any, using methods well known in the art provide epoxy resin compositions of this invention. Advancement reaction of the oligomers and unreacted polyphenol, if any, and an epoxy resin using methods well known in the art provide advanced epoxy resin compositions of this invention. The epoxy resin compositions of this invention possess enhanced mechanical properties, especially tensile strength and elongation.

SUMMARY OF THE INVENTION

The present invention pertains to vinyl ester compositions prepared by reacting (A) at least one polyepoxide of a hydroxy-aromatic oligomer containing at least one triazine group and at least one imino carbamate linkage; with (B) from about 0.75 to about 1.2, preferably from about 0.9 to about 1, moles of a monounsaturated monocarboxylic acid or mixture of monounsaturated monocarboxylic acids per epoxide group; in the presence of (C) a catalytic quantity of a suitable catayst.

Component (A) is obtained either by epoxidation of hydroxyaromatic oligomers containing triazine groups and imino carbamate linkages or by advancement reaction of a polyepoxide represented by formulas V, VI, VII, VIII or a mixture thereof with hydroxyaromatic oligomers containing triazine groups and imino carbamate linkages.

Another aspect of the present invention pertains to compositions comprising from about 1 to about 99, preferably from about 30 to about 70 percent by weight of the aforementioned vinyl ester and from about 99 to about 1, preferably from about 70 to about 30 percent by weight of at least one copolymerizable ethylenically unsaturated monomer.

Another aspect of the present invention pertains to compositions comprising a mixture of vinyl esters comprising (A) from about 1 to about 99, preferably from about 5 to about 50 percent by weight of the aforementioned vinyl ester compositions and (B) from about 99 to about 1, preferably from about 95 to about 50 percent by weight of a vinyl ester composition resulting from reacting an epoxy resin represented by formulas V, VI, VII, VIII or a mixture of such epoxy resins and at least one of acrylic acid or methacrylic acid.

Another aspect of the present invention concerns a composition comprising (I) from about 1 to about 99 percent by weight, preferably from about 30 to about 70 percent by weight of the above mixture of vinyl esters and (II) from about 99 to about 1, preferably from about 70 to about 30 percent by weight of at least one copolymerizable ethylenically unsaturated monomer.

A further aspect of the present invention pertains to the product resulting from curing the aforementioned vinyl esters or vinyl ester and copolymerizable ethylenically unsaturated monomer formulations.

DETAILED DESCRIPTION OF THE INVENTION

Suitable materials having an average of more than one aromatic hydroxyl group per molecule which can be employed to prepare the cyanate mixture precursor to the triazine functional oligomers containing imino carbamate linkages include, for example, those represented by the formulas:

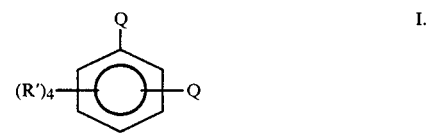

I.

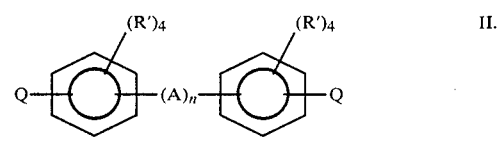

II.

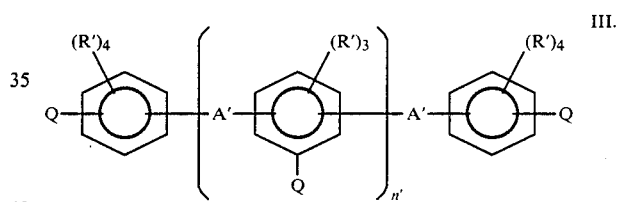

III.

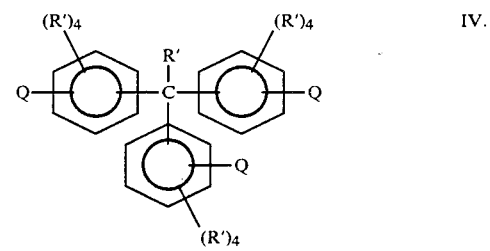

IV.

wherein Q is an —OH group; A is a divalent hydrocarbon group having from 1 to about 12, preferably from about 1 to about 6 carbon atoms, —S—, —S—S—,

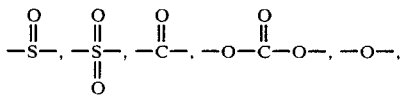

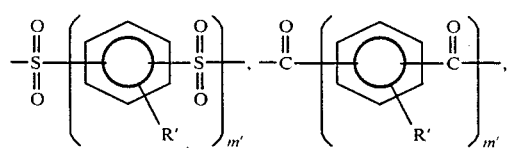

-continued

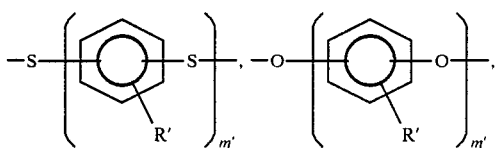

and the like; each A' is a divalent hydrocarbon group having from 1 to about 3, preferably 1, carbon atoms or a

group; p has a value of from zero to about 10, preferably from zero to 3; each each R' is independently hydrogen or a hydrocarbyl or hydrocarbyloxy group having from 1 to about 6 carbon atoms or a halogen, preferably chlorine or bromine; m' has a value from 1 to about 100, preferably from 1 to about 10, n has a value of zero or 1 and n' has a value from about 0.001 to about 6.

Particularly suitable aromatic hydroxyl-containing compounds include, for example, o-, m- and p-dihydroxybenzene, 2-tert-butyl hydroquinone, 2,4-dimethyl resorcinol, 2,5-di-tert-butyl hydroquinone, tetramethyl hydroquinone, 2,4,6-trimethyl resorcinol, 4-chlororesorcinol, 4-tert butyl pyrocatechol, 1,1-bis(4-hydroxyphenyl)ethane; 2,2-bis(4-hydroxyphenyl)propane; 2,2-bis(4-hydroxyphenyl)pentane; bis(4,4'-dihydroxphenyl)methane; 4,4'-dihydroxydiphenyl, 2,2'-dihydroxydiphenyl, 3,3',5,5'-tetramethyl-4,4'-dihydroxydiphenyl, 3,3',5,5'-tetrachloro-4,4'-dihydroxydiphenyl, 3,3',5,5'-tetrachloro-2,2'-dihydroxydiphenyl, 2,2',6,6'-tetrachloro-4,4'-dihydroxydiphenyl, 4,4'-bis(3-hydroxy)phenoxy)-diphenyl, 4,4'-bis((4-hydroxy)phenoxy)-diphenyl, 2,2'-dihydroxy-1,1'-binaphthyl, and other dihydroxydiphenyls; 4,4'-dihydroxydiphenyl ether, 3,3',5,5'-tetramethyl-4,4'-dihydroxydiphenyl ether, 3,3',5,5'-tetrachloro-4,4'-hydroxydiphenyl ether, 4,4'-bis(p-hydroxyphenoxy)-diphenyl ether, 4,4'-bis(p-hydroxyphenyl isopropyl)-diphenyl ether, 4,4'-bis(p-hydroxyphenoxy)-benzene, 4,4'-bis(p-hydroxyphenoxy)-diphenyl ether, 4,4'bis(4(4-hydroxyphenoxy)phenyl sulfone)-diphenyl ether, and other dihydroxydiphenyl ethers; 4,4'-dihydroxydiphenyl sulfone, 3,3',5,5'-tetramethyl-4,4'-dihydroxydiphenyl sulfone, 3,3'5,5'-tetrachloro-4,4'-dihydroxydiphenyl sulfone, 4,4'-bis(p-hydroxyphenyl isopropyl)-diphenyl sulfone, 4,4'-bis((4-hydroxy)phenoxy)-diphenyl sulfone, 4,4'-bis((3-hydroxy)phenoxy)-diphenyl sulfone, 4,4'-bis(4-(4-hydroxyphenyl-isopropyl)-phenoxy)-diphenyl sulfone, 4,4'-bis(4(4-hydroxy)diphenoxy)-diphenyl sulfone, and other diphenyl sulfones; 4,4'-dihydroxydiphenyl methane, 4,4'-bis(p-hydroxyphenyl)-diphenyl methane, 2,2'-bis(p-hydroxyphenyl)-propane, 3,3',5,5'-tetramethyl-2,2'-bis(p-hydroxyphenyl)-propane, 3,3',5,5,'-tetrachloro-2,2'-bis(p-hydroxyphenyl)propane, 1,1-bis(p-hydroxyphenyl)-cyclohexane, bis-(2-hydroxy-1-naphthyl)-methane, 1,2-bis(p-hydroxyphenyl)-1,1,2,2-tetramethyl ethane, 4,4'-dihydroxybenzophenone, 4,4'-bis((4-hydroxy)phenoxy)-benzophenone, 1,4-bis(p-hydroxyphenyl isopropyl)-benzene, phloroglucinol, pyrogallol, 2,2',5,5'-tetrahydroxy-diphenyl sulfone, other dihydroxydiphenyl alkanes, tris(hydroxyphenyl)methane, tris(4-hydroxy-2-bromophenyl)methane, other tris(hydroxyphenyl)alkanes, mixtures thereof and the like.

Suitable cyanogen halides which can be employed to prepare the cyanate mixture precursor include, for example, cyanogen chloride, cyanogen bromide, mixtures thereof and the like.

If desired, the method reported in *Organic Synthesis*, Vol. 61, page 35–67 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases such as alkali metal hydroxides and tertiary amines, such as, for example, sodium hydroxide, potassium hydroxide, triethylamine, pyridine, lutidine, mixtures thereof and the like. The tertiary amines are most preferred as the base material.

Suitable co-oligomerization catalysts which can optionally although most preferably be employed for conversion of the cyanate mixture and aromatic polyamine mixture to hydroxyaromatic oligomers containing both triazine groups and imino carbamate linkages include, for example, metal salts of carboxylic acids, such as, for example, lead octoate, zinc stearate, zinc acetylacetonate, usually at concentrations of about 0.001 to about 5 percent. Most preferred catalysts are cobalt naphthenate and cobalt octoate, mixtures thereof and the like.

Although the co-oligomerization of the cyanate mixture with an aromatic polyamine provides both triazine groups and imino carbamate linkages in the oligomer product, it is felt that other reactions may also be occurring. For example, minor amounts of phenolic groups may react with cyanate groups to form imino carbonate linkages.

Suitable aromatic polyamines for co-oligomerization with the cyanate mixture are those represented by formulas I, II, III and IV wherein Q is an —NH$_2$ group and A, A', R', p, m', n and n' are as hereinbefore defined.

Particularly suitable aromatic amine-containing compounds include, for example, o-, m- and p-diaminobenzene, 2-tert-butyl-1,4-diaminobenzene, 2,4-dimethyl-1,3-diaminobenzene, 2,5-di-tert-butyl-1,4-diaminobenzene, 2,3,5,6-tetramethyl-1,4-diaminobenzene, 2,4,6-trimethyl-1,3-diaminobenzene, 4-chloro-1,3-diaminobenzene, 4-tert-butyl-1,2-diaminobenzene, 1,1-bis(4-aminophenyl)ethane, 2,2-bis(4-aminophenyl)propane, 2,2-bis(4-aminophenyl)pentane, bis(4,4'-diaminophenyl)methane, 4,4'-diaminodiphenyl, 2,2'-diaminodiphenyl, 3,3',5,5'-tetramethyl-4,4'-diaminodiphenyl, 3,3',5,5'-tetrachloro-4,4'-diaminodiphenyl, 3,3',5,5'-tetrachloro-2,2'-diaminodiphenyl, 2,2',6,6'-tetrachloro-4,4'-diaminodiphenyl, 4,4'-bis((3-amino)phenoxy)diphenyl, 4,4'-bis((4-amino)phenoxy)diphenyl, 2,2'-diamino-1,1'-binaphthyl, and other diaminodiphenyls; 4,4'-diaminodiphenyl ether, 3,3',5,5'-tetramethyl-4,4'-diaminodiphenyl ether, 3,3',5,5'-tetrachloro-4,4'-diaminodiphenyl ether, 4,4'-bis(p-aminophenoxy)diphenyl ether, 4,4'-bis(p-aminophenyl isopropyl)diphenyl ether, 4,4'-bis(p-aminophenoxy)benzene, 4,4'-bis(p-aminophenoxy)diphenyl ether, 4,4'-bis(4(4-aminophenoxy)phenyl sulfone)diphenyl ether, and other diaminodiphenyl ethers; 4,4'-diaminodiphenyl sulfone, 3,3',5,5'-tetramethyl-4,4'-diaminodiphenyl sulfone, 3,3',5,5'-tetrachloro-4,4'-diaminodiphenyl sulfone, 4,4'-bis(p-aminophenyl isopropyl)diphenyl sulfone, 4,4'- bis((4-amino)phenoxy)diphenyl sulfone, 4,4'-bis((3-amino)phenoxy)diphenyl sulfone, 4,4'-bis(4-(4-aminophenyl)isopropyl)phenoxy)diphenyl sulfone, 4,4'-bis(4(4-amino)diphenoxy)diphenyl sulfone, and other diphenyl sulfones; 4,4'-diaminodiphenyl methane, 4,4'-bis(p-aminophenyl)diphenyl methane, 2,2'-bis(p-aminophenyl)propane, 3,3',5,5'-tetramethyl-2,2'-bis(p-aminophenyl)propane, 3,3',5,5'-tetrachloro-2,2'-bis(p-aminophenyl)propane, 1,1-bis(p-aminophenyl)cyclohexane, bis(2-amino-1-naphthyl)methane, 1,2-bis(p-aminophenyl)-1,1,2,2-tetramethylethane, 4,4'-diaminobenzophenone, 4,4'-bis((4-amino)phenoxy)benzophenone, 1,4-bis(p-aminophenyl isopropyl)benzene, 2,2',5,5'-tetraaminodiphenyl sulfone, other diaminodiphenyl alkanes, tris(aminophenyl)methane, tris(4-amino-2-bromophenyl)methane, other tris(aminophenyl)alkanes, mixtures thereof and the like.

Reaction to provide the cyanate mixture is usually conducted at a temperature of from about −40° C. to about 60° C., preferably from about −20° C. to about 25° C. for from about 10 minutes (600 s) to about 120 minutes (7200 s), preferably from about 10 minutes (600 s) to about 60 minutes (3600 s).

If desired, the reaction to provide the cyanate mixture can be conducted in the presence of an inert solvent reaction medium. Suitable such solvents include, for example, water, chlorinated hydrocarbons, ketones, mixtures thereof and the like. Most preferred solvents include acetone and methylene chloride.

The co-oligomerization reaction is usually conducted at a temperature of from about 70° C. to about 250° C., preferably from about 70° C. to about 200° C. for a period of from about 15 minutes (900 s) to about 240 minutes (14400 s), preferably from about 30 minutes (1800 s) to about 120 minutes (7200 s). The co-oligomerization reaction is preferably performed in the presence of the aforementioned catalyst(s).

The cyanate mixture and aromatic polyamine are thoroughly blended to provide a homogeneous mixture prior to co-oligomerization reaction. This is accomplished either by grinding or blending the solid cyanate mixture and aromatic polyamine or, preferably by dispersing or dissolving or slurring said cyanate mixture and aromatic polyamine in an inert solvent followed by devolatilization to remove said solvent. Suitable such inert solvents include, for example, chlorinated hydrocarbons and aromatic hydrocarbons.

Epoxidation of the co-oligomerization product can be performed by the known methods described in *Handbook of Epoxy Resins* by Lee and Neville, McGraw-Hill (1967) which is incorporated herein by reference. This usually includes reacting the co-oligomerization product (step II) with an epihalohydrin followed by dehydrohalogenation with a basic-acting material such as an alkali metal hydroxide and finally recovering the resultant glycidyl ether product.

Suitable epoxy resins for advancement reaction with the hydroxyaromatic oligomers containing triazine groups and imino carbamate linkages include, for example, those represented by the formulas:

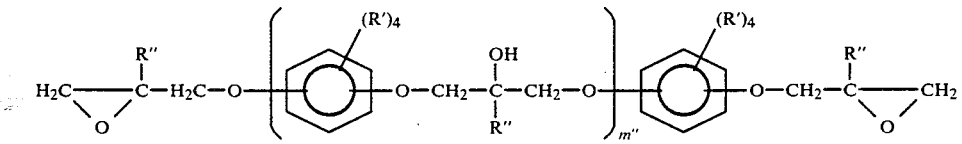

V.

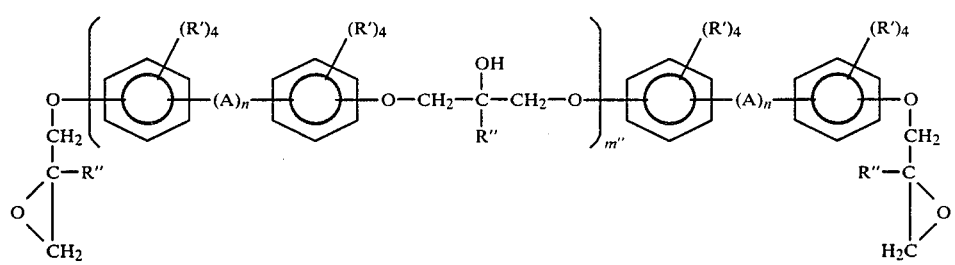

VI.

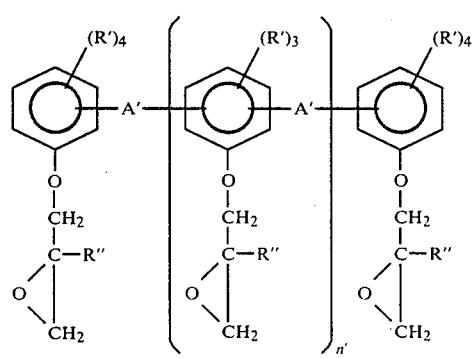

VII.

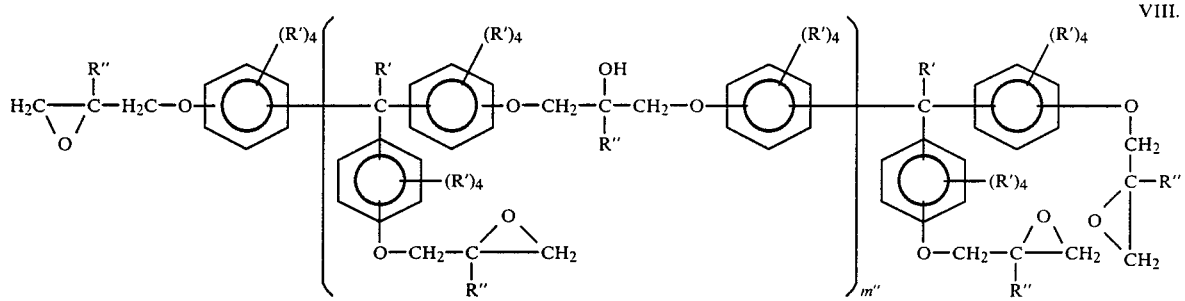

wherein A, A', R', n and n' are as herein before defined, each R" is independently hydrogen or a hydrocarbyl group having from 1 to about 3 carbon atoms, and m" has a value from zero to about 40, preferably from 0.1 to about 5.

The advancement reaction is optionally, although preferably, performed in the presence of 0.01 to about 2.0 percent by weight of a suitable catalyst. Suitable catalysts include bases, basic acting materials, acids and the like. Preferred catalysts are the quaternary ammonium salts and phosphonium salts. A most preferred catalyst is benzyltrimethylammonium chloride. Reaction times and temperatures vary depending on the composition of the epoxy resin reactant used; the amount and type of catalyst used, if any; the presence of inert solvent, if any. Typically, the advancement reaction when catalyzed is conducted at a temperature of from about 50° C. to about 150° C., preferably from about 90° C. to about 120° C. for from about 15 minutes (900 s) to about 240 minutes (14400 s), preferably from about 30 minutes (1800 s) to about 90 minutes (5400 s). Advancement reaction times and temperatures are generally longer and higher, respectively, for the non-catalyzed reaction.

Suitable catalysts for preparing epoxy resins and advanced epoxy resins are described in the *Handbook of Epoxy Resins* by Lee and Neville, McGraw-Hill (1967), as well as by Bender et al. in U.S. Pat. No. 2,506,486 which are incorporated herein by reference.

Suitable monounsaturated monocarboxylic acids for reaction with the polyepoxides of the hydroxyaromatic oligomers containing triazine groups and imino carbamate linkages include acrylic acid, methacrylic acid, cyanoacrylic acid, crotonic acid, α-phenylacrylic acid, methoxyacrylic acid, cinnamic acid and the like or mixtures thereof. Methacrylic acid is a most preferred monounsaturated monocarboxylic acid. A mole ratio of 0.9 to 1 monounsaturated monocarboxylic acid group per epoxide group is preferred with a ratio of 0.96 to 0.98 being most preferred. The reaction between the polyepoxide of the hydroxyaromatic oligomers containing triazine groups and imino carbamate linkages and a monounsaturated monocarboxylic acid is typically performed in the presence of a catalyst. Suitable catalysts for use herein are well known in the prior art. A quantity of from about 0.01 to about 2 percent by weight has been found to be a particularly suitable quantity of catalyst. Aqueous chromium trichloride is a most preferred catalyst at concentrations of about 0.01 to 0.3 percent by weight of the polyepoxide employed.

A suitable process inhibitor is typically used in the reaction between the polyepoxide of the hydroxyaromatic oligomers containing triazine groups and imino carbamate linkages and a monounsaturated monocarboxylic acid to prevent gelation (homopolymerization of the vinyl ester and/or copolymerization of the vinyl ester with unreacted monounsaturated monocarboxylic acid). Suitable inhibitors for use herein are well known in the prior art. Hydroquinone activated with air is a most preferred inhibitor at concentrations of from about 100 to about 500 ppm based on the weight of the polyepoxide and monounsaturated monocarboxylic acid used.

The reaction to produce the vinyl ester is usually conducted at a temperature of from about 50° C. to about 125° C., preferably from about 80° to about 120° C. for from about 120 minutes (7200 s) to about 720 minutes (43,200 s), preferably from about 240 minutes (14,400 s) to about 480 minutes (28,800 s). Although reaction times and reaction temperatures can vary substantially, most preferred vinyl ester compositions are obtained by reacting to a specific conversion, typically 1.5 to 0.25 percent carboxylic acid.

The vinyl ester is typically combined with one or more reactive diluents such as copolymerizable ethylenically unsaturated monomers.

A wide selection of polymerizable monomers containing a >C=CH$_2$ group is available from the many known classes of vinyl monomers. Representative species are the vinyl aromatic compounds which include such monomers as styrene, α-methylstyrene, vinyl toluenes, halogenated styrenes, t-butylstyrene, divinyl benzene and the like.

Other suitable monomers include the methyl, ethyl, isopropyl, octyl, etc., esters of acrylic or methacrylic acid, vinyl acetate, diallyl maleate, dimethallyl fumarate, acidic monomers such as acrylic acid, methacrylic acid, crotonic acid and amide monomers such as acrylamide, N-alkyl acrylamides and the like and mixtures thereof.

Preferred polymerizable monomers containing a >C=CH$_2$ group are styrene, vinyl toluene, ortho-, meta- and para-halostyrenes, vinyl naphthalenes, the various alpha-substituted styrenes, as well as the various di-, tri- and tetrahalo styrenes, and acrylic, methacrylic and crotonic acid esters which include both the saturated alcohol esters and the hydroxyalkyl esters.

The blended vinyl ester resin composition may consist of up to 99 percent by weight of polymerizable monomer containing the >C=CH$_2$ group with the balance of the combined weight consisting of said vinyl ester resin. Preferably, the resin composition consists of 30 to 70 percent by weight of said monomer and 70 to 30 percent by weight of said vinyl ester resin.

While it is preferred in many applications to blend the vinyl ester resin with a polymerizable monomer, the present invention is not limited thereto. The vinyl ester resin can be cured and polymerized in the absence of such a monomer and can be applied and utilized as solutions in a nonpolymerizable solvent, such as is practiced in certain coating operations.

According to the present invention, the curing of the resin compositions is effected by the application of heat and/or pressure in the presence of a free radical forming catalyst. Catalysts that may be used for the curing or polymerization are preferably the peroxide catalysts, such as benzoyl peroxide, lauroyl peroxide, azobisisobutyronitrile, t-butyl hydroperoxide, t-butylperbenzoate, methyl ethyl ketone peroxide, potassium persulfate and the like. The amount of the catalyst added will preferably vary from 1 to about 2 percent by weight of reactants. Temperatures employed may vary over a considerable range but usually are in the range of 20° to 250° C.

Additionally, more rapid curing of the thermosetting resin compositions may be accomplished by the addition of accelerating agents such as lead or cobalt naphthenate, N,N-dimethylaniline and the like, usually in concentrations ranging from about 0.01 to about 2 weight percent.

Preferred compositions of this invention also include blends of the vinyl ester resins of polyepoxides of hydroxyaromatic oligomers containing triazine groups and imino carbamate linkages and vinyl ester resins of the prior art, as well as the cured compositions prepared from said blends. The cured compositions of said vinyl ester resin blends possess improvements in one or more physical or mechanical properties such as tensile strength, flexural strength and/or percent elongation and ductility.

The vinyl ester resins of this invention are useful to make laminates, castings, coatings, and the like. The laminates are made by mixing into the vinyl ester resin a known amount of a free radical forming catalyst and optionally, an accelerator and adding this mixture to a suitable woven or nonwoven fibrous reinforcement such as asbestos fibers, aramid fibers, boron fibers, glass and carbon hybrid fibers, carbon fibers, fibrous glass or inorganic fibers. The vinyl ester resin can be rolled, sprayed, or impregnated into the fibrous reinforcement such as fibrous glass. When fibrous glass is used, it can be in any form such as chopped strands, filaments, glass ribbons, glass yarns, or reinforcing rats.

The vinyl ester resin may be compounded with solvents, pigments, fire suppressants, low profile additives or other resinous products and cured to form useful coatings in a manner well known in the art.

The following examples are illustrative of the invention, but are not to be construed as to limiting the scope thereof in any manner.

EXAMPLE 1

A. Preparation of Diphenol Cyanate Mixture

Cyanogen bromide (1.65 moles, 174.79 grams) was added to a reactor containing a stirred solution of bisphenol A (3.00 moles, 684.9 grams) in acetone (1200 milliliters) cooled to −5° C. under a nitrogen atmosphere. The stirred solution was allowed to equilibrate at −5° C. Triethylamine (1.50 moles, 151.80 grams) was then added to the reactor over a 24 minute (1440 s) period and so as to maintain the reaction temperature at −5° to −2° C. After completion of the triethylamine addition, the reactor was maintained at −5° to −2° C. for an additional 30 minutes (1800 s), followed by addition of the reaction product to chilled water (1 gallon) with agitation. After 5 minutes (300 s), the water and product mixture was subjected to multiple extractions with three 500 milliliter portions of methylene chloride. The combined methylene chloride extracts were sequentially washed with 500 milliliters of dilute 1% aqueous hydrochloric acid, 800 milliliters of water and then dried over anhydrous sodium sulfate. The dry methylene chloride extract was filtered and solvent removed by rotary evaporation under vacuum. The diphenol cyanate mixture was recovered (705.0 grams) as a light yellow colored solid at room temperature (25° C.). Infrared spectrophotometric analysis demonstrated the presence of the cyanate groups as well as unreacted hydroxyl groups. Liquid chromatographic analysis demonstrated the presence of 56.24 area percent bisphenol A, 38.55 area percent bisphenol A monocyanate, and 5.24 area percent bisphenol A dicyanate.

B. Co-oligomerization of Diphenol Cyanate Mixture and an Aromatic Diamine

A portion of the diphenol cyanate mixture (500.0 grams) from A above, 4,4'-diaminodiphenyl methane (9.40 grams) and methylene chloride solvent (400.0 grams) were mixed on a shaker until a homogeneous mixture was obtained. The mixture was thoroughly blended with 6.0 percent cobalt naphthenate (0.10 percent by weight, 0.51 gram) then placed in a glass tray. The tray was then placed in a vacuum oven and methylene chloride solvent devolatilized from the mixture. The devolatilized mixture was then placed in a forced-air, convection-type oven and maintained for 2.0 hours (7200 s) at 177° C. The hydroxyaromatic co-oligomerization product containing triazine groups and imino carbamate linkages was recovered in quantitative yield as a transparent, light yellow-colored, brittle solid at room temperature (25° C.). Infrared spectrophotometric analysis demonstrated complete disappearance of the cyanate functionality, appearance of the triazine functionality, appearance of imino carbamate functionality and the presence of unreacted hydroxyl functionality.

C. Epoxidation of Hydroxyaromatic Co-oligomerization Product Containing Triazine Groups and Imino Carbamate Linkages A portion of the hydroxyaromatic co-oligomerization product from B above (200.0 grams), epichlorohydrin (6.4488 moles, 596.71 grams), isopropanol (35 percent by weight of epichlorohydrin used, 321.31 grams), and water (8 percent by weight of epichlorohydrin used, 51.89 grams) were added to a reactor and stirred under a nitrogen atmosphere at 50° C. until a solution was formed. At that time, dropwise addition of a sodium hydroxide (2.322 moles, 92.86 grams) solution in water (371.44 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.032 mole, 41.27 grams) in water (165.09 grams) was added dropwise to the reactor over the next 20 minutes (1200 s). Fifteen minutes (900 s) later, the reactor was cooled to 40° C., then an initial water wash (400 milliliters) was added to the reactor. The reactor contents were transferred to a separatory funnel. The water wash layer was separated and discarded while the organic layer was added back into the separatory funnel along with a second water wash (600 milliliters). The organic layer was separated then added back into the separatory funnel along with a third water wash (800 milliliters) and additional epichlorohydrin (200 milliliters). The recovered organic layer was stripped of solvents by rotary evaporation at 110° C. for 60 minutes (3600 s) under vacuum. The epoxy resin was recovered (271.60 grams) as a transparent, light yellow colored liquid at room temperature (25° C.). Epoxide titration revealed the presence of 20.65 percent by weight epoxide.

D. Methacrylation of Polyepoxide of Hydroxyaromatic Oligomers Containing Triazine Groups and Imino Carbamate Linkages A portion (186.0 grams) of the epoxy resin from C above was added to a reactor and heated to 90° C. Hydroquinone (0.104 grams) was added then stirring and sparging with air (0.5 liter per minute) were started. Three minutes (180 s) later, methacrylic acid (74.51 grams) was added. After seven minutes (420 s) the reaction temperature stabilized at 90° C. then 33.33 percent aqueous chromium trichloride catalyst (0.233 gram) was added and the temperature controller was set at 110° C. and this temperature was achieved three minutes (180 s) later. After four minutes (240 s) at the 110° C. reaction temperature, the temperature controller was set at 115° C. and this temperature was achieved two minutes (120 s) later. After 233 minutes (13,980 s) at the 115° C. reaction temperature, titration of a pair of samples of the vinyl ester demonstrated the presence of 0.69 percent carboxylic acid and 1.00 percent epoxide. The reactor was cooled to 80° C. then phenothiazine (0.052 grams) and styrene (145.34 grams) were sequentially added to the reactor. The vinyl ester resin of the polyepoxide of hydroxyaromatic oligomers containing triazine groups and imino carbamate linkages was recovered as a transparent, light amber colored liquid.

COMPARATIVE EXPERIMENT 1

A. Preparation of Diphenol Cyanate Mixture

Cyanogen bromide (0.825 mole, 87.39 grams) was added to a reactor containing a stirred solution of bisphenol A (1.5 moles, 342.45 grams) in acetone (950 milliliters) cooled to −5° C. under a nitrogen atmosphere. The stirred solution was allowed to equilibrate at −5° C., then triethylamine (0.75 mole, 75.9 grams) was added to the reactor over a 20 minute (1200 s) period and so as to maintain the reaction temperature at −1° to −5° C. After completion of the triethylamine addition, the reactor was maintained at −3° to 5° C. for an additional 30 minutes (1800 s), followed by addition of the reaction product to chilled water (1 gallon) with agitation. After 5 minutes (300 s), the water and product mixture was subjected to multiple extractions with three 400 milliliter portions of methylene chloride. The combined methylene chloride extracts were sequentially washed with 500 milliliters of dilute hydrochloric acid (5 percent), 1000 milliliters of water, and then dried over anhydrous sodium sulfate. The dry methylene chloride extract was filtered and solvent removed by rotary evaporation under vacuum. The diphenol cyanate mixture was recovered (337 grams) as a white-colored solid at room temperature (25° C.). Infrared spectrophotometric analysis demonstrated the presence of the cyanate groups as well as unreacted hydroxyl groups. Liquid chromatographic analysis demonstrated the presence of 59.53 area percent bisphenol A, 35.01 area percent bisphenol A monocyanate, and 5.46 area percent bisphenol A dicyanate.

B. Trimerization of Diphenol Cyanate Mixture

A portion of the diphenol cyanate mixture (335 grams) from A above and 6 percent cobalt naphthenate (0.1 percent by weight, 0.34 gram) were thoroughly mixed and placed in a glass tray. The tray was then placed in a forced-air, convection-type oven and maintained for 1.25 hour (4500 s) at 177° C. The hydroxyaromatic oligomers containing triazine groups were recovered in quantitative yield as a transparent, brittle solid at room temperature (25° C.). The oligomers had a greenish-colored cast due to the catalyst. At the 177° C. temperature, the oligomers were still totally fluid. Infrared spectrophotometric analysis demonstrated complete disappearance of the cyanate groups, appearance of the triazine functionality, and the presence of unreacted hydroxyl groups.

C. Epoxidation of Hydroxyaromatic Oligomers Containing Triazine Groups

A portion (250 grams) of the hydroxyaromatic oligomers containing triazine groups from B above, epichlorohydrin (8.25 moles, 763.05 grams), isopropanol (35 percent by weight of epichlorohydrin used, 410.87 grams), and water (8 percent by weight of epichlorohydrin used, 66.35 grams) were added to a reactor and stirred under a nitrogen atmosphere at 60° C. until a solution was formed. At that time, the reactor was cooled to 50° C. and dropwise addition of a sodium hydroxide (2.97 moles, 118.75 grams) solution in water (475 grams) commenced and was completed over the next 30 minutes (1800 s). During this sodium hydroxide addition, the reaction temperature was allowed to increase to 60° C. and was then held at this temperature. Thirty minutes (1800 s) after the addition of sodium hydroxide solution, a second solution of sodium hydroxide (1.32 mole, 52.78 grams) in water (211.11 grams) was added dropwise to the reactor over the next 20 minutes (1200 s). Fifteen minutes (900 s) later, the reactor was cooled to 40° C. then an initial water wash (250 grams) was added to the reactor and the contents were transferred to a separatory funnel. The water wash layer was separated and discarded while the organic layer was added back into the separatory funnel along with a second water wash (250 grams). The water wash layer was separated and discarded while the organic layer was added back into the separatory funnel with a final water wash (800 grams). Epichlorohydrin (200 grams) was added to the separatory funnel, then the water wash layer was separated and discarded. The recovered organic layer was stripped of solvents by rotary evaporation at 100° C. for 90 minutes (5400 s) under vacuum. The epoxy resin was recovered (346.1 grams) as a transparent, light yellow-colored liquid at room temperature (25° C.) Infrared spectrophotometric analysis demonstrated substantially complete disappearance of hydroxyl groups, appearance of epoxide groups and presence of triazine groups. Epoxide titration revealed the presence of 22.23 percent by weight epoxide.

D. Methacrylation of Triazine Functional Epoxy Resin

A portion (300 grams) of the epoxy resin containing triazine groups from C above was added to a reactor and heated to 90° C. Hydroquinone (0.172 grams) then methacrylic acid (129.38 grams) were sequentially added then stirring and sparging with air (0.5 liter per minute) were started. After ten minutes (600 s) at the 90° C. reaction temperature, 33.33 percent aqueous chromium trichloride catalyst (0.375 gram) was added and the temperature controller was set at 110° C. and this temperature was achieved 15 minutes (900 s) later. After 26 minutes (1560 s) at the 110° C. reaction temperature, the temperature controller was set at 112° C. and this temperature was achieved six minutes (360 s) later. After four minutes (240 s) at the 112° C. reaction temperature, the temperature controller was set at 115° C. and this temperature was achieved five minutes (300 s) later. After 4 hours (14,400 s) at the 115° C. reaction temperature, the temperature controller was set at 117° C. and this temperature was achieved three minutes (180 s) later. After 117 minutes (7020 s) at the 117° C. reaction temperature, titration of a sample of the vinyl ester demonstrated the presence of 1.298 percent carboxylic acid. Infrared spectrophotometric analysis demonstrated substantially complete disappearance of epoxide groups, appearance of ester groups and presence of triazine groups. The reactor was cooled to 80° C. then phenothiazine (0.172 gram) and styrene (240.63 grams) were sequentially added to the reactor. The vinyl ester resin containing triazine groups (668 grams) was recovered as a transparent, light yellow-colored liquid.

EXAMPLE 4

A. Preparation of Diphenol Cyanate Mixture

Cyanogen bromide (1.1 moles, 116.52 grams) was added to a reactor containing a stirred solution of bisphenol A (2.0 moles, 456.60 grams) in acetone (1050 milliliters) cooled to −5° C. under a nitrogen atmosphere. The stirred solution was allowed to equilibrate at −5° C., then triethylamine (1.0 mole, 101.19 grams) was added to the reactor over an eighteen minute (1080 s) period and so as to maintain the reaction temperature at −5° to 0° C. After completion of the triethylamine addition, the reactor was maintained at −2° to 5° C. for an additional 30 minutes (1800 s), followed by addition of the reaction product to chilled water (1.5 gallons) with agitation. After 5 minutes (300 s), the water and product mixture was subjected to multiple extraction with three 400 milliliter portions of methylene chloride. The combined methylene chloride extracts were sequentially washed with 500 milliliters of dilute hydrochloric acid (5 percent), 1000 milliliters of water and then dried over anhydrous sodium sulfate. The dry methylene chloride extract was filtered and solvent removed by rotary evaporation under vacuum. The diphenol cyanate mixture was recovered (398.03 grams) as a white-colored solid at room temperature (25° C.). Infrared spectrophotometric analysis demonstrated the presence of the cyanate groups as well as unreacted hydroxyl groups. Liquid chromatographic analysis demonstrated the presence of 57.11 area percent bisphenol A, 35.33 area percent bisphenol A monocyanate and 7.56 area percent bisphenol A dicyanate.

B. Co-oligomerization of Diphenol Cyanate Mixture and an Epoxy Resin

A portion of the diphenol cyanate mixture (388.7 grams), an epoxy resin (25.64 grams) and 6 percent cobalt naphthenate (0.1 percent by weight, 0.41 gram) were thoroughly mixed and placed in a glass tray. The epoxy resin had an epoxide equivalent weight (EEW) of 340.4 and was prepared by reaction of a diglycidyl ether of bisphenol A (EEW=183) (0.8 equiv., 146.4 grams) with bisphenol A (0.4 equiv., 45.66 grams) and benzyltrimethylammonium chloride catalyst (60 percent aqueous) (0.19 gram) at 120° C. for 50 minutes. The tray was then placed in a forced-air, convection-type oven and maintained for 1.25 hours (4500 s) at 177° C. The hydroxyaromatic co-oligomerization product containing triazine and oxazoline groups was recovered in quantitative yield as a transparent, light amber-colored, brittle solid at room temperature (25° C.). Infrared spectrophotometric analysis demonstrated complete disappearance of the cyanate groups, appearance of triazine groups, appearance of oxazoline groups and the presence of unreacted hydroxyl groups.

C. Epoxidation of Hydroxyaromatic Co-oligomerization Product Containing Triazine and Oxazoline Groups A portion of the hydroxyaromatic co-oligomerization product containing triazine and oxazoline groups (225 grams), epichlorohydrin (7.198 moles, 665.99 grams), isopropanol (35 percent by weight of epichlorohydrin used, 358.61 grams), and water (8 percent by weight of epichlorohydrin used, 57.91 grams were added to a reactor and stirred under a nitrogen atmosphere at 50° C. until a solution was formed. At that time, dropwise addition of a sodium hydroxide (2.59 moles, 103.64 grams) solution in water (414.58 grams) commenced and was completed over the next 30 minutes (1800 s). During this sodium hydroxide addition, the reaction temperature was allowed to increase to 60° C. and was then held at this temperature. Thirty minutes (1800 s) after the addition of sodium hydroxide solution, a second solution of sodium hydroxide (1.15 mole, 46.06 grams) in water 184.26 grams) was added dropwise to the reactor over the next 20 minutes (1200 s). Fifteen minutes (900 s) later, the reactor was cooled to 40° C., then an initial water wash (250 grams) was added to the reactor and the contents were transferred to a separatory funnel. The water wash layer was separated and discarded while the organic layer was added back into the separatory funnel along with a second water wash (250 grams). The water wash layer was separated and discarded while the organic layer was added back into the separatory funnel with a final water wash (800 grams). Epichlorohydrin (200 grams) was added to the separatory funnel, then the water wash layer was separated and discarded. The recovered organic layer was stripped of solvents by rotary evaporation at 100° C. for 90 minutes (5400 s) under vacuum. The epoxy resin was recovered (306.34 grams) as a transparent, light yellow-colored liquid at room temperature (25° C.). Infrared spectrophotometric analysis demonstrated substantially complete disappearance of hydroxyl groups, appearance of epoxide groups and presence of both triazine and oxazoline groups. Epoxide titration revealed the presence of 19.26 percent by weight epoxide.

D. Methacrylation of Hydroxyaromatic Co-oligomerization Product Containing Triazine and Oxazoline Groups A portion (282.0 grams) of the epoxy resin containing triazine and oxazoline groups from C above was added to a reactor and heated to 90° C. Hydroquinone (0.155 grams) then methacrylic acid (105.37 grams) were sequentially added then stirring and sparging with air (0.5 liter per minute) were started. After eleven minutes (660 s) at the 90° C. reaction temperature, 33.33 percent aqueous chromium trichloride catalyst (0.353 gram) was added and the temperature controller was set at 110° C. and this temperature was achieved 8 minutes (480 s) later. After 26 minutes (1560 s) at the 110° C. reaction temperature, the temperature controller was set at 112° C. and this temperature was achieved 2 minutes (120 s) later. After 4 minutes (240 s) at the 112° C. reaction temperature, the temperature controller was set at 115° C. and this temperature was achieved 4 minutes (240 s) later. After 250 minutes (15,000 s) at the 115° C. reaction temperature, titration of a sample of the vinyl ester demonstrated the presence of 0.42 percent carboxylic acid. Infrared spectrophotometric analysis demonstrated substantially complete disappearance of epoxide groups, appearance of ester groups and presence of both triazine and oxazoline groups. The reactor was cooled to 80° C. then phenothiazine (0.155 grams) and styrene (217.25 grams) were sequentially added to the reactor. The vinyl ester resin containing triazine and oxazoline groups (603.2 grams) was recovered as a transparent, light yellow-colored liquid.

EXAMPLE 2

A portion of the vinyl ester resin of Example 1-D, Comparative Experiment 1-D and Comparative Experiment 2-D were used for Brookfield viscosity (25° C.) and SPI gel test (84° C.) determinations. Clear, unfilled ⅛ inch (0.3175 cm) castings were prepared for heat distortion temperature (264 psi, 1820 kPa), tensile and flexural strength, flexural modulus, percent elongation and average Barcol hardness (934-1 scale) determinations. Each casting was cured at room temperature (25° C.) using a cure system of 1 percent by weight benzoyl peroxide and 0.05 percent by weight N,N-dimethylaniline. Twenty-four hours (86,400 s) after the cure exotherm had subsided, post curing for 2 hours (7200 s) at 100° C. was completed. Mechanical properties of tensile (8) and flexural (6) test pieces were determined using an Instron machine with standard test methods (ASTM D-638 and D-790). Heat distortion temperature of clear casting test pieces (2) was determined using an Aminco Plastic Deflection Test (American Instrument Co.) with standard test methods (ASTM D-648 modified). The results are given in Table I.

EXAMPLE 3

A. Epoxy Resin Advancement with Hydroxyaromatic Oligomers Containing Triazine Groups and Imino Carbamate Linkages A portion (62.02 grams, 0.40 hydroxyl equivalent) of hydroxyaromatic oligomers containing triazine groups and imino carbamate linkages from Example 1-B, a diglycidyl ether of bisphenol A (435.672 grams, 2.40 equiv.) having an epoxide equivalent weight (EEW) of 181.5 and 60 percent aqueous benzyltrimethylammonium chloride (0.498 gram) catalyst were added to a reactor and heated to 120° C. with stirring under a nitrogen atmosphere. After 60 minutes (3600 s) at the 120° C. reaction temperature, the reactor was cooled and the epoxy resin advanced with oligomers containing triazine groups and imino carbamate linkages was recovered as a transparent, light yellow colored liquid. Epoxide titration revealed the resin to contain 16.70 percent epoxide.

B. Methacrylation of Advanced Epoxy Resin

A portion (245.0 grams) of the advanced epoxy resin from A above was added to a reactor and heated to 90° C. Hydroquinone (0.130 grams) was added then stirring and sparging with air (0.5 liter per minute) were started. Three minutes (180 s) later, methacrylic acid (79.37 grams) was added. After seven minutes (420 s) the reaction temperature stabilized at 90° C. then 33.33 percent aqueous chromium trichloride catalyst (0.306 gram) was added and the temperature controller was set at 110° C. and this temperature was achieved three minutes (180 s) later. After two minutes (120 s) at the 110° C. reaction temperature, the temperature controller was set at 115° C. and this temperature was achieved two minutes (120 s) later. After 253 minutes (15,180 s) at the 115° C. reaction temperature, titration of a pair of samples of the vinyl ester demonstrated the presence of 0.90 percent carboxylic acid and 0.91 percent epoxide. The reactor was cooled to 80° C. then phenothiazine (0.065 grams) and styrene (181.38 grams) were sequentially added to the reactor. The vinyl ester resin of the advanced polyepoxide of hydroxyaromatic oligomers containing triazine groups and imino carbamate linkages was recovered as a transparent, light yellow colored liquid.

A portion of the vinyl ester resin was used to prepare a clear, unfilled ⅛ inch (0.3175 cm) casting using the

TABLE I

|  | EXAMPLE 1-D | COMPARATIVE EXPERIMENT 1-D | COMPARATIVE EXPERIMENT 2-D |
| --- | --- | --- | --- |
| Brookfield Viscosity (cp) | 553 | 151 | 190 |
| SPI Gel Test[1] |  |  |  |
| gel time, min./sec. | 1.0/60 | 15.65/939 | 15.4/924 |
| cure time, min./sec. | 2.3/138 | 20/1200 | 20.8/1248 |
| maximum exotherm, °F./°C. | 366/186 | 372/189 | 358/181 |
| Barcol Hardness | 45 | 41 | 38 |
| Heat Distortion Temperature, °F./°C. | 228.2/109 | 221.9/105.5 | 213.4/100.8 |
| Tensile Strength $\times 10^{-3}$, psi/kPa | 13.9/95.9 | 9.3/64.1 | 11.5/79.3 |
| Elongation (%) | 4.2 | 2.2 | 3.0 |
| Flexural Strength $\times 10^{-3}$, psi/kPa | 22.8/157.2 | 21.7/149.6 | 23.0/158.6 |
| Flexural Modulus $\times 10^{-5}$, psi/kPa | 5.82/40.1 | 5.77/39.78 | 5.45/37.58 |

[1]Example 2 resin contained 200 ppm phenothiazine while Comparative Experiment 1 and 2 resins contained 400 ppm phenothiazine.

method of Example 2. The physical and mechanical properties were evaluated using the method of Example 2. The results are reported in Table II.

TABLE II

| | |
|---|---|
| Brookfield Viscosity (cp) | 290 |
| SPI Gel Test | |
| gel time, min./sec. | 1.5/90 |
| cure time, min./sec. | 2.8/168 |
| maximum exotherm, °F./°C. | 410/210 |
| Barcol Hardness | 42 |
| Heat Distortion Temperature, °F./°C. | 226.8/108.3 |
| Tensile Strength × $10^{-3}$, psi/kPa | 13.4/92.4 |
| Elongation (%) | 6.3 |
| Flexural Strength × $10^{-3}$, psi/kPa | 24.2/166.9 |
| Flexural Modulus × $10^{-5}$, psi/kPa | 5.39/37.2 |

COMPARATIVE EXPERIMENT 3

A commercial grade of vinyl ester resin was prepared based on the following method:

About 1 equivalent of methacrylic acid was reacted with 0.75 equivalent of an epoxy novolac having an epoxide equivalent weight (EEW) of 176–181 and 0.25 equivalent of a glycidyl polyether of bisphenol A having an EEW of 186–192. The above reactants were heated to 115° C. with a chromium trichloride catalyst system, air and hydroquinone present until the carboxylic acid content reached at 1 percent. The reactants were cooled and then styrene (containing 50 ppm of t-butyl catechol) was added. The final resin diluted with styrene had a pH of 7.7 and contained approximately.

| Contents | Percent by Weight |
|---|---|
| styrene | 36 |
| methacrylic acid | 20.6 |
| epoxy novolac (EEW = 176–181, average functionality = ~3.6) | 32.1 |
| diglycidyl ether of bisphenol A (EEW = 186–192) | 11.3 |
| | 100.0 |

A portion of the vinyl ester resin was used to prepare a clear, unfilled ⅛ inch (0.3175 cm) casting using the method of Example 2. The physical and mechanical properties were evaluated using the method of Example 2. The results are reported in Table III.

EXAMPLE 4

A portion (62.0 grams) of the vinyl ester resin of Example 3-B and a portion (186.0 grams) of the vinyl ester resin of Comparative Experiment 3 were thoroughly blended together. A portion of the vinyl ester resin blend was used to prepare a clear, unfilled ⅛ inch (0.3175 cm) casting using the method of Example 2. The physical and mechanical properties were evaluated using the method of Example 2. The results are reported in Table III.

TABLE III

| | Example 4 | Comp. Expt. 3 |
|---|---|---|
| Brookfield Viscosity (cp) | 254 | 260 |
| SPI Gel Test | | |
| gel time, min./sec. | 4.8/288 | 8.0/480 |
| cure time, min./sec. | 6.0/396 | 9.5/570 |
| maximum exotherm °F./°C. | 426/219 | 408/209 |
| Barcol Hardness | 45 | 39 |
| Heat Distortion Temperature °F./°C. | 225.5/107.5 | 214/101.1 |

TABLE III-continued

| | Example 4 | Comp. Expt. 3 |
|---|---|---|
| Tensile Strength × $10^{-3}$ psi/kPa | 12.4/85.5 | 9.0/62.1 |
| Elongation (%) | 3.7 | 2.8 |
| Flexural Strength × $10^{-3}$ psi/kPa | 24.1/166.2 | 19.2/132.4 |
| Flexural Modulus × $10^{-5}$ psi/kPa | 5.55/38.27 | 6.40/44.13 |

I claim:
1. A vinyl ester resin composition prepared by reacting
   (A) a polyepoxide of a hydroxyaromatic oligomer containing at least one triazine group and at least one imino carbamate linkage or mixture of such polyepoxides; with
   (B) a monounsaturated monocarboxylic acid or mixture of such acids; in the presence of
   (C) a catalytic quantity of a suitable catalyst for effecting a reaction between components (A) and (B);
wherein components (A) and (B) are employed in amounts which provides from about 0.75 to about 1.2 mole of component (B) per epoxide group present in component (A).

2. A vinyl ester resin of claim 1 wherein
   (i) said polyepoxide is prepared by reacting an epihalohydrin with a hydroxyaromatic oligomer containing both triazine groups and imino carbamate linkages, dehydrohalogenating the resultant halohydrin ether and thereafter recovering the resultant glycidyl ether product; and
   (ii) components (A) and (B) are employed in amounts which provide from about 0.9 to about 1 mole of component (B) per epoxide group present in component (A).

3. A vinyl ester resin of claim 2 wherein said epihalohydrin is epichlorohydrin and said hydroxyaromatic oligomer is prepared by
   (I) reacting at a temperature and time sufficient to essentially complete the reaction
      (D) at least one material having an average of more than one aromatic hydroxyl group per molecule with
      (E) at least 0.01 but not more than 0.95 moles of at least one cyanogen halide per aromatic hydroxyl group in the presence of
      (F) from about 0.01 to about 1.1 moles of a suitable base per aromatic hydroxyl group
   and thereafter recovering the resultant cyanate-containing mixture; and
   (II) co-oligomerizing the product resulting from
      (I) with
      (G) an aromatic polyamine in an amount which provides a ratio of amine groups to cyanate groups of from about 0.01:1 to about 0.25:1
   optionally in the presence of
      (H) a suitable co-oligomerization catalyst and at a temperature and time to essentially complete the co-oligomerization reaction.

4. A vinyl ester resin composition of claim 3 wherein
   (i) component (D) is represented by the formula

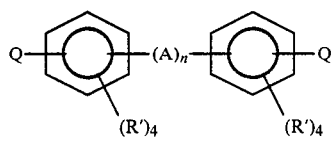  II.

wherein each A is independently a divalent hydrocarbon group having from 1 to about 12, carbon atoms, —S—, —S—,

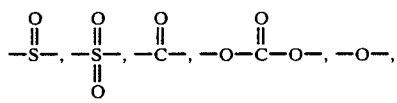

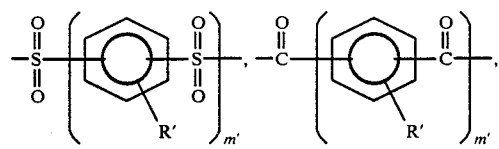

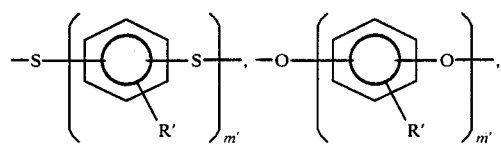

and the like; each R'
is independently hydrogen or a hydrocarbyl group having from 1 to about 6 carbon atoms or a halogen; Q is a hydroxyl group; m' has a value of 1 to about 100; and n has a value of zero or 1;

(ii) component (F) is a tertiary amine;
(iii) component (G) is represented by formula II above wherein each Q is an —NH$_2$ group and A, R, m' and n are as defined above;
(iv) components (D) and (E) are present in quantities which provide a ratio of moles of cyanogen halide per hydroxyl group of from about 0.05:1 to about 0.55:1;
(v) component (F) is present in a quantity which provides a ratio of moles of component (E) per hydroxyl group of from about 0.05:1 to about 0.6:1; and
(vi) component (G) is present in a quantity which provides a ratio of amine groups to cyanate groups of from about 0.03:1 to about 0.20:1.

5. A vinyl ester resin composition of claim 4 wherein
(i) component (B) is acrylic acid, methacrylic acid or a combination thereof;
(ii) component (D) is bisphenol A;
(iii) component (E) is cyanogen bromide;
(iv) component (F) is triethylamine; and
(v) component (G) is 4,4'-diaminodiphenyl methane.

6. A vinyl ester resin composition of claim 1 wherein
(i) components (A) and (B) are employed in amounts which provide from about 0.9 to about 1 mole of component (B) per epoxide group present in component (A);
(ii) component (A) is an advanced epoxy resin prepared by reacting
(1) at least one hydroxyaromatic oligomer containing at least one triazine group and at least one imino carbamate linkage; with
(2) at least one material having an average of more than one 1,2-epoxy group per molecule;
wherein components (1) and (2) are employed in amounts which provide a ratio of hydroxyl groups to epoxy groups of from about 0.1:1 to about 1:1.

7. A vinyl ester resin composition of claim 6 wherein
(i) component (1) is prepared by
(I) reacting at a temperature and time sufficient to essentially complete the reaction
(D) at least one material having an average of more than one aromatic hydroxyl group per molecule with
(E) at least 0.01 but not more than 0.95 moles of at least one cyanogen halide per aromatic hydroxyl group in the presence of
(F) from about 0.01 to about 1.1 moles of a suitable base per aromatic hydroxyl group
and thereafter recovering the resultant cyanate-containing mixture; and
(II) co-oligomerizing the product resulting from (I) with
(G) an aromatic polyamine in an amount which provides a ratio of amine groups to cyanate groups of from about 0.01:1 to about 0.25:1
optionally in the presence of
(H) a suitable co-oligomerization catalyst and at a temperature and time to essentially complete the co-oligomerization reaction; and
(ii) component (2) is a material represented by the formula

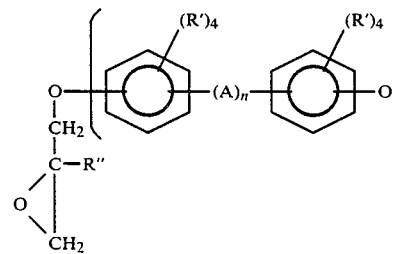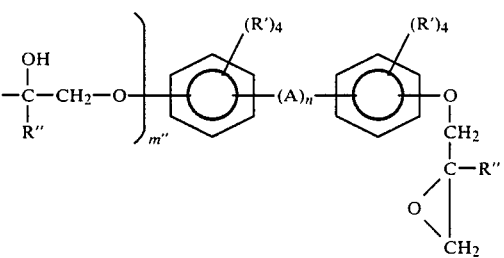

wherein each A is independently a divalent hydrocarbon group having from 1 to about 12, carbon atoms, —S—, —S—,

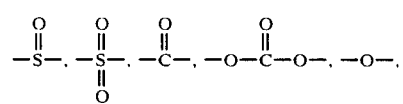

-continued

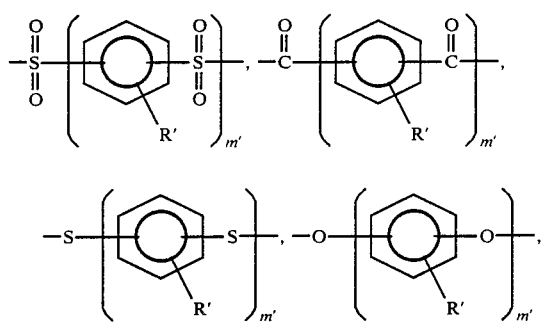

and the like; each R' is independently hydrogen or a hydrocarbyl or hydrocarbyloxy group having from 1 to about 6 carbon atoms or a halogen; each R'' is hydrogen or a hydrocarbyl group having from 1 to about 3 carbon atoms; m' has a value of 1 to about 100; m'' has a value from about zero to about 40; and n has a value of zero or 1; and (iii) components (1) and (2) are present in quantities which provide a ratio of hydroxyl groups to epoxy groups of from about 0.1:1 to about 0.5:1.

8. A vinyl ester resin composition of claim 7 wherein
(i) in component (1), component (D) is represented by the formula

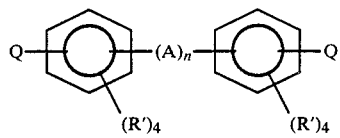

wherein each A is independently a divalent hydrocarbon group having from 1 to about 12, carbon atoms, —S—, —S—,

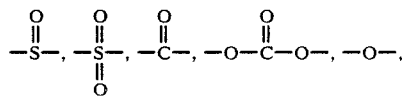

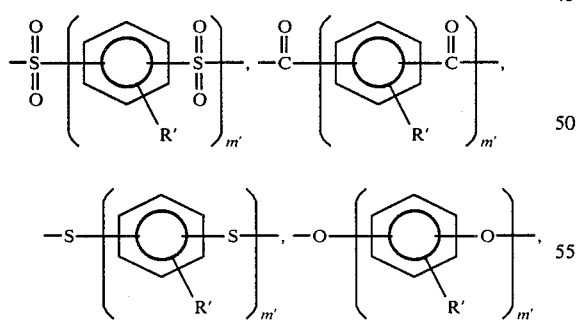

and the like; each R' is independently hydrogen or a hydrocarbyl group having from 1 to about 6 carbon atoms or a halogen; Q is a hydroxyl group; m' has a value of 1 to about 100; and n has a value of zero or 1;

(ii) in component (1), component (F) is a tertiary amine;

(iii) in component (1), component (G) is represented by formula II above wherein each Q is an —NH$_2$ group and A, R, m' and n are as defined above;

(iv) component (F) is present in a quantity which provides a ratio of moles of component (E) per hydroxyl group of from about 0.05:1 to about 0.6:1; and (v) component (G) is present in a quantity which provides a ratio of amine groups to cyanate groups of from about 0.03:1 to about 0.20:1; and (vi) in component (2), (A) is an isopropylidene group, R'' is hydrogen, m'' has an average value of from about 0.1 to about 5 and n has a value of 1.

9. A vinyl ester resin composition of claim 8 wherein
(i) component (B) is acrylic acid, methacrylic acid or a combination thereof;
(ii) component (D) is bisphenol A;
(iii) component (E) is cyanogen bromide;
(iv) component (F) is triethylamine; and
(v) component (G) is 4,4'-diaminodiphenyl methane.

10. A composition comprising from about 1 to about 99 percent by weight of at least one vinyl ester resin composition of claims 1, 2, 3, 4, 5, 6, 7, 8 or 9 and from about 99 to about 1 percent by weight of at least one copolymerizable ethylenically unsaturated monomer and wherein said percent by weight is based upon the combined weight of the vinyl ester resin component and the copolymerizable monomer component.

11. A composition of claim 10 wherein said vinyl ester resin component comprises from about 30 to about 70 percent by weight and said copolymerizable monomer component comprises from about 70 to about 30 percent by weight of the combined weight of said vinyl ester resin component and said copolymerizable monomer component.

12. A composition of claim 11 wherein said copolymerizable monomer is styrene, α-methyl styrene, chloromethyl styrene, ethyl acrylate, 2-ethyl hexyl acrylate, methyl methacrylate, p-methyl styrene, t-butyl styrene, divinylbenzene, 2-hydroxy ethyl acrylate, or mixture thereof.

13. A composition comprising a mixture of vinyl ester resins comprising
(a) at least one vinyl ester resin composition of claims 1, 2, 3, 4, 5, 6, 7, 8 or 9; and
(b) at least one vinyl ester resin resulting from reacting acrylic acid, methacrylic acid or a combination of such acids with an epoxy resin or mixture of epoxy resins, represented by the following formulas V, VI, VII or VIII

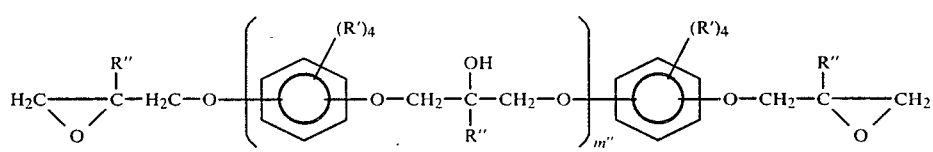

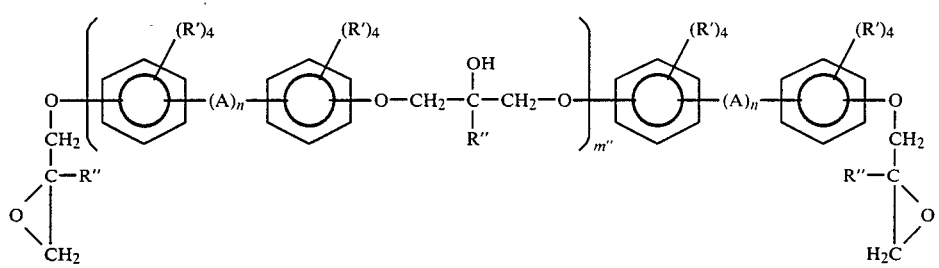

VI.

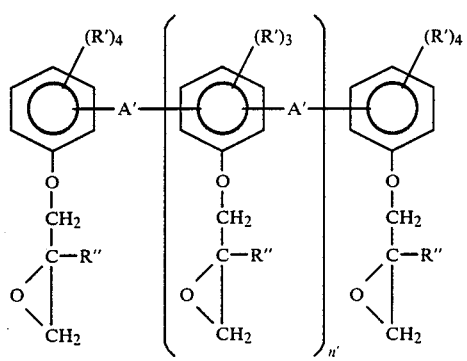

VII.

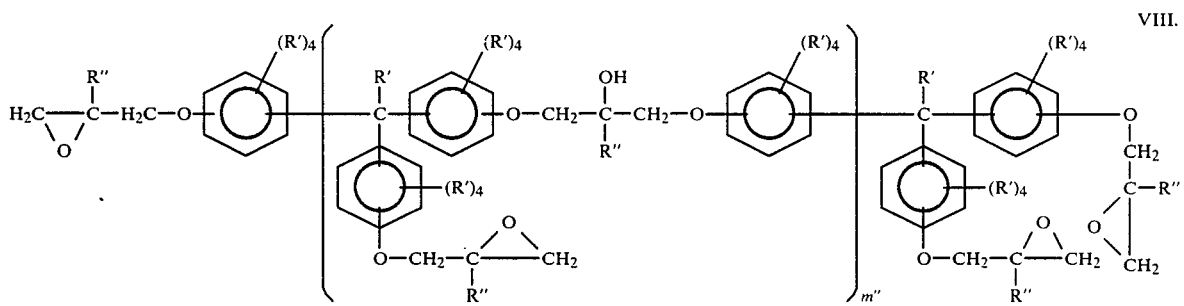

VIII.

wherein A is a divalent hydrocarbon group having from 1 to about 12 carbon atoms, —S—, —S—S—,

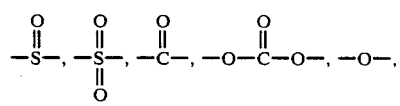

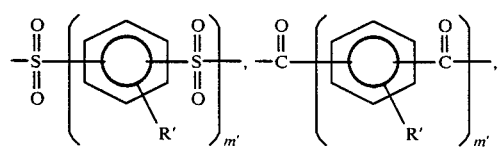

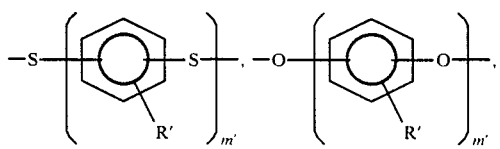

and the like; each A' is a divalent hydrocarbon group having from 1 to about 3, preferably 1, carbon atoms or a

group; each R' is independently hydrogen or a hydrocarbyl or hydrocarbyloxy group having from 1 to about 6 carbon atoms or a halogen; each R" is independently hydrogen or a hydrocarbyl group having from 1 to about 3 carbon atoms; m' has a value from 1 to about 100; m" has a value from zero to about 40; n has a value of zero or 1; n' has a value from about 0.001 to about 6; and p has a value of from zero to about 10.

14. A composition of claim 13 wherein said epoxy resin of component (b) is represented by formula VI wherein A is an isopropylidene group; each R' is hydrogen or bromine; each R" is hydrogen; n has a value of 1 and m" has a value of from 0.1 to about 5.

15. A composition comprising from about 1 to about 99 percent by weight of at least one vinyl ester resin composition of claim 13 and from about 99 to about 1 percent by weight of at least one copolymerizable ethylenically unsaturated monomer and wherein said percent by weight is based upon the combined weight of the vinyl ester resin component and the copolymerizable monomer component.

16. A composition of claim 15 wherein said vinyl ester resin component comprises from about 30 to about 70 percent by weight and said copolymerizable monomer component comprises from about 70 to about 30 percent by weight of the combined weight of said vinyl ester resin component and said cpolymerizable monomer component.

17. A composition of claim 16 wherein said copolymerizable monomer is styrene, α-methyl styrene, chloromethyl styrene, ethyl acrylate, 2-ethyl hexyl acrylate, methyl methacrylate, p-methyl styrene, t-butyl styrene, divinylbenzene, 2-hydroxy ethyl acrylate or mixture thereof.

18. A composition comprising from about 1 to about 99 percent by weight of at least one vinyl ester resin composition of claim 14 and from about 99 to about 1 percent by weight of at least one copolymerizable ethylenically unsaturated monomer and wherein said percent by weight is based upon the combined weight of the vinyl ester resin component and the copolymerizable monomer component.

19. A composition of claim 18 wherein said vinyl ester component comprises from about 30 to about 70 percent by weight and said copolymerizable monomer component comprises from about 70 to about 30 percent by weight of the combined weight of said vinyl ester resin component and said copolymerizable monomer component.

20. A composition of claim 19 wherein said copolymerizable monomer is styrene, α-methyl styrene, chloromethyl styrene, ethyl acrylate, 2-ethyl hexyl acrylate, methyl methacrylate, p-methyl styrene, t-butyl styrene, divinylbenzene, 2-hydroxy ethyl acrylate or mixture thereof.

21. The product resulting from curing a composition of claim 1.

22. The product resulting from curing a composition of claim 2.

23. The product resulting from curing a composition of claim 3.

24. The product resulting from curing a composition of claim 4.

25. The product resulting from curing a composition of claim 5.

26. The product resulting from curing a composition of claim 6.

27. The product resulting from curing a composition of claim 7.

28. The product resulting from curing a composition of claim 8.

29. The product resulting from curing a composition of claim 9.

30. The product resulting from curing a composition of claim 10.

31. The product resulting from curing a composition of claim 11.

32. The product resulting from curing a composition of claim 12.

33. The product resulting from curing a composition of claim 13.

34. The product resulting from curing a composition of claim 14.

35. The product resulting from curing a composition of claim 15.

36. The product resulting from curing a composition of claim 16.

37. The product resulting from curing a composition of claim 17.

38. The product resulting from curing a composition of claim 18.

39. The product resulting from curing a composition of claim 19.

40. The product resulting from curing a composition of claim 20.

* * * * *